C. M. MORTON AND C. H. STEAVENSON.
PORTABLE SCREENING APPARATUS FOR COAL AND OTHER MATERIALS.
APPLICATION FILED DEC. 18, 1918.

1,315,385.

Patented Sept. 9, 1919.
5 SHEETS—SHEET 2.

C. M. MORTON AND C. H. STEAVENSON.
PORTABLE SCREENING APPARATUS FOR COAL AND OTHER MATERIALS.
APPLICATION FILED DEC. 18, 1918.

1,315,385.

Patented Sept. 9, 1919.
5 SHEETS—SHEET 3.

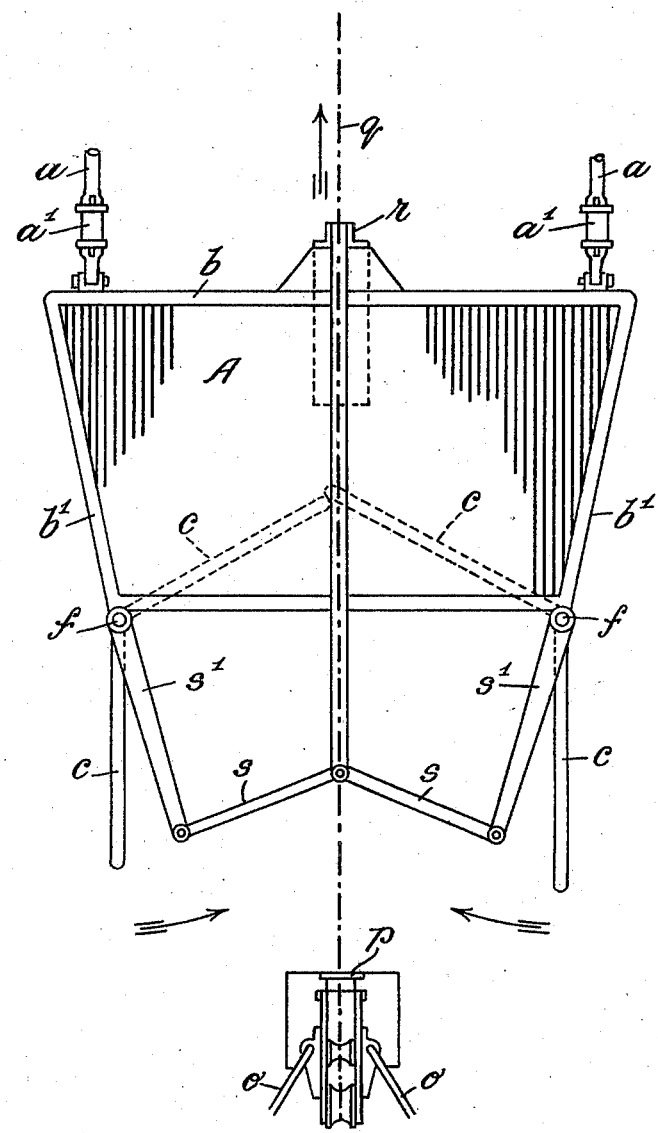

C. M. MORTON AND C. H. STEAVENSON.
PORTABLE SCREENING APPARATUS FOR COAL AND OTHER MATERIALS.
APPLICATION FILED DEC. 18, 1918.

1,315,385. Patented Sept. 9, 1919.
5 SHEETS—SHEET 5.

UNITED STATES PATENT OFFICE.

CHARLES MILTON MORTON, OF NEWCASTLE-UPON-TYNE, AND CHARLES HERBERT STEAVENSON, OF GATESHEAD, ENGLAND.

PORTABLE SCREENING APPARATUS FOR COAL AND OTHER MATERIALS.

1,315,385.　　　　Specification of Letters Patent.　　Patented Sept. 9, 1919.

Application filed December 18, 1918.　Serial No. 267,373.

*To all whom it may concern:*

Be it known that we, CHARLES MILTON MORTON, subject of the King of Great Britain, residing at Akenside House, Quayside, Newcastle-upon-Tyne, England, and CHARLES HERBERT STEAVENSON, subject of the King of Great Britain, residing at Redheugh Colliery, Gateshead, England, have invented new and useful Improvements in Connection with Portable Screening Apparatus for Coal and other Materials; and we do hereby declare the following to be a full, clear, and exact description of the invention, such as will enable others skilled in the art to which it appertains to make and use the same.

This invention relates to screening apparatus for coal and other materials, and has for its object to provide a portable screening apparatus capable of being moved from one heap of coal or other material in bulk to another, and of grading the coal or the like into different classes, no matter what distance the heaps may be from the collieries etc, and of removing the same from the heap to railway trucks or other vehicles and at same time grading the material into various classes ready for transport to the consumer or depot, thus effecting a considerable economy both in time and labor as compared with the usual custom of bringing coal or the like from the heap or from vessels to fixed screens.

Similarly the apparatus serves to lift coal or other material from ships' holds, coal hulks, or places other than heaps; and screen same while lifting, and deliver it graded as required straight into trucks or depots.

The portable screening apparatus, in accordance with this invention, consists of a main screen and a supplementary screening and lifting bucket or grab, the former detachably affixed to the end of the jib, and the latter to the main chain, of a locomotive derrick crane; the main screen being of sufficient dimensions to admit the whole of the bucket and its appurtenances and permit of said bucket being opened to its fullest extent when inside said main screen; and the operations of the apparatus include the lifting of the coal or other material by the bucket, the partial screening followed by the complete screening of same, and depositing it into railway trucks ready for transport.

And in order that our invention may be fully understood and readily carried into effect we will now proceed to describe same with reference to the accompanying drawings and figures and letters of reference marked thereon, that is to say:—

In each of these figures the doors of the main screen are shown as being operated by means of racks and quadrants.

Fig. 4 is a side elevational view of the main screen the doors of which are operated by a toggle mechanism.

Figure 5:
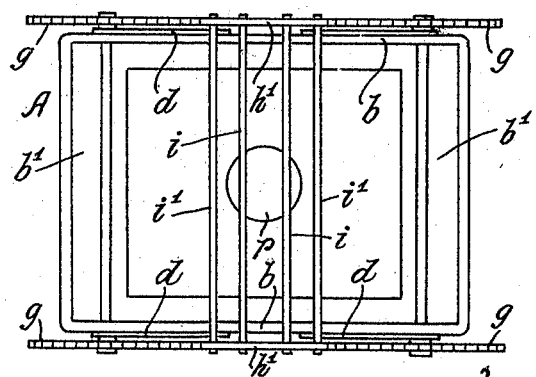

Fig. 5 is a fragmentary plan of the main screen, and

Figure 6:
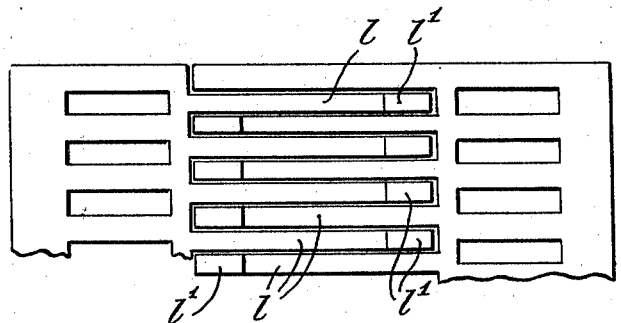
Figure 7:
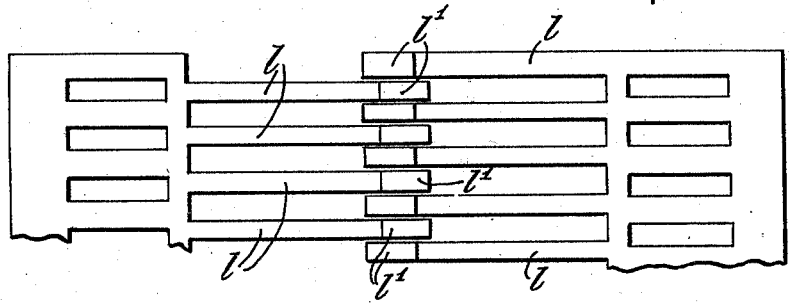

Figs. 6 and 7 are similar views of the bucket or grab showing the position of the bars when closed and when partly opened, respectively, as when jigging the contents to remove the finer particles thereof in the preliminary stage of grading operations.

Figure 8:
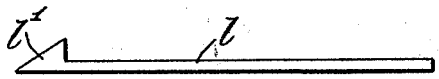

Fig. 8 is a side elevation of one of the bars aforesaid.

Figure 9:
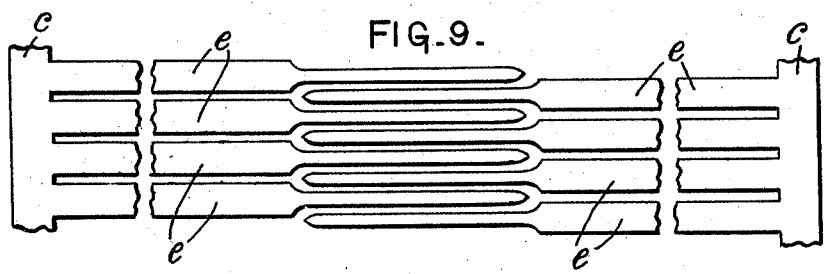

Fig. 9 is a fragmentary plan of the doors of the main screen, shown in their closed position.

Figure 10:
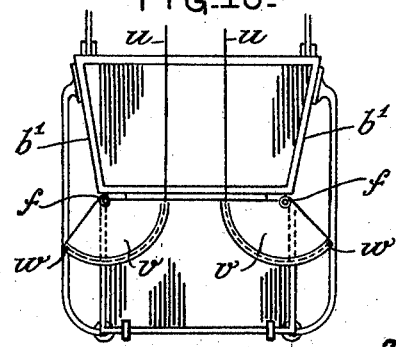

Fig. 10 is side elevation of the main screen and a suitable form of rope gear for operating the door.

Similar letters of reference indicate like parts wherever appearing.

A, indicates the main screen.

B, the lifting bucket or grab, and

C, is the outer end of the crane jib carrying the apparatus.

The main screen "A" is fixed by detachable hangers *a* (the ends of which are attached to shock absorbers *a'*) to the end of the jib "C", and the lifting bucket or grab "B", which, in accordance with this invention, also serves as a supplementary screen in the manner hereinafter described, is suspended from the jib "C" and operated in the usual and known manner by ropes or chains passing over pulleys and connected to winding drums on the platform of the crane under the control of the crane man or operator.

Figure 1:
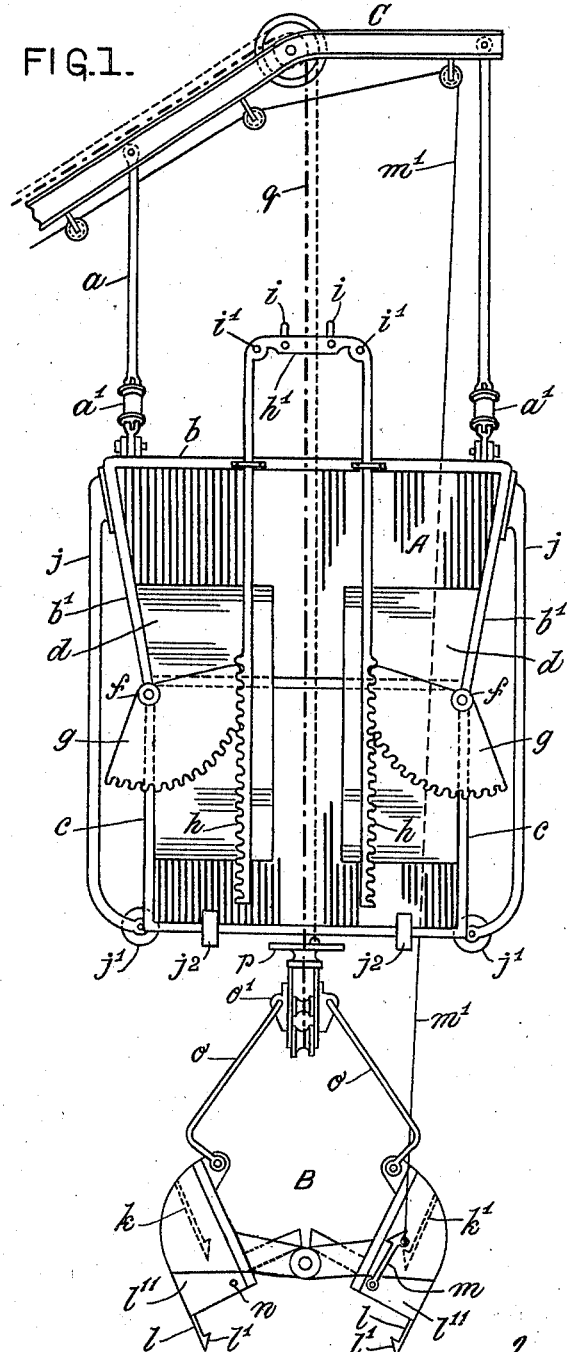
Figure 1 is a side elevational view of the apparatus with the bucket or grab (shown open) in its lowered position ready to lift coal or the like from bulk.
Figure 2:
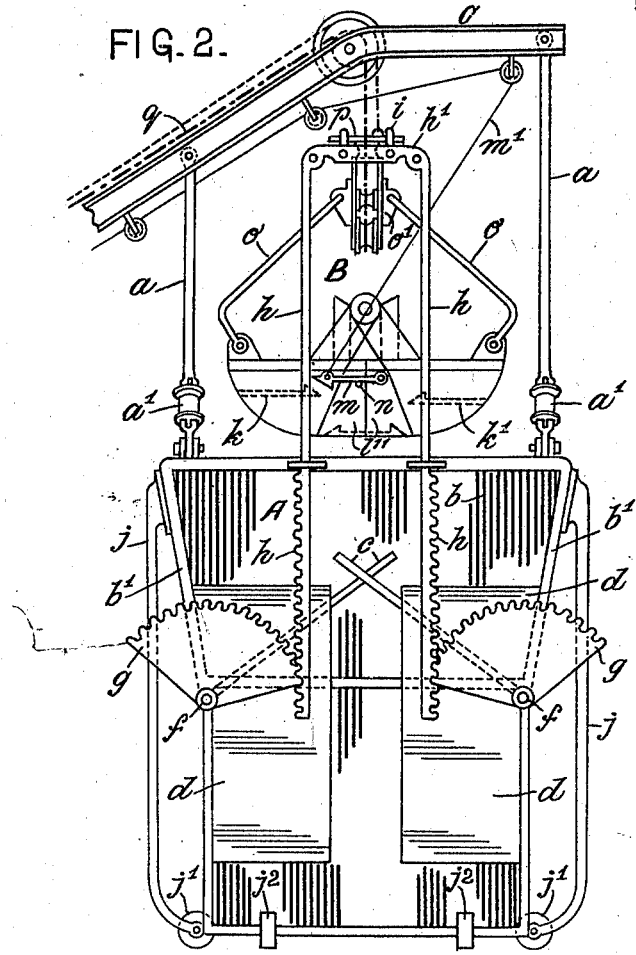
Fig. 2 is a similar view but with the bucket or grab (shown closed) in the raised position.
Figure 3:
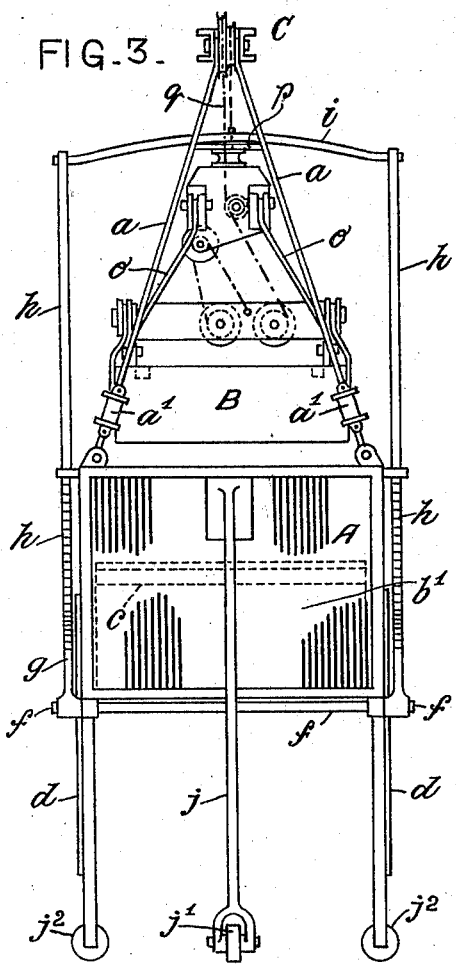
Fig. 3 is an end elevational view of the same.

The main screen "A", in accordance with this invention, comprises a structure of rectangular form having two vertical sides $b$ and two inclined or sloping ends $b'$, with a bottom formed of two hinged doors $c$ capable of being opened downwardly so as to hang vertically to permit of the lifting bucket being passed therethrough when being raised or lowered (see Fig. 1) and of being closed by being turned on their hinges inwardly and upwardly till assuming any required angle between 45° below, and 45° above, the horizontal. In Figs. 2 and 3 the doors are shown as raised (closed) to an angle of approximately 45° above the horizontal.

The walls $b$ $b'$ of the main screen "A" are made of steel or iron open grating, the spaces between the grating being according to the class of material to be screened. To prevent the contents of the screen escaping into and clogging the door-operating mechanism hereinafter described the sides $b$ of the screen are fitted with sheet iron plates $d$ which serve to make said sides partly solid and prevent the egress of any material therethrough. These plates $d$ extend to a suitable distance below the structure "A", see particularly Figs. 1, 2, and 3.

The doors $c$ which form the bottom of the main screen "A" are detachable interlacing open iron or steel bars $e$, shown separately in the fragmentary plan view Fig. 9, the openings being according to the screening or separating results required. Or, the doors may be made of iron or steel square meshes with suitable operating mechanism. As shown, the doors formed of the interlacing iron or steel bars may be operated by a rack and quadrant mechanism, or by toggle links, or by ropes or chains passing over suitably arranged grooved pulleys or attached to levers.

In Figs. 1, 2, 3, and 5, the doors $c$ are automatically closed by a quadrant and rack mechanism brought into action by the upward movement of the bucket or grab "B" as it is raised. As the grab is lowered the doors open by gravity.

Each door $c$ is supported and swung upon a round steel hinge bar $f$ situated at the bottom of each end $b'$ and stretching from one side of the main screen "A" to the other; and keyed to each end of each hinge bar $f$ is a toothed quadrant $g$, each quadrant being operated by a rack $h$, the teeth of the quadrants working in the teeth of the racks.

The racks $h$ are four in number, two being fixed on each side $b$ of the screen "A". The tops of said racks $h$ are connected by the bars $h'$, and the bar $h'$ of the one pair of racks is connected or tied to that of the other pair of racks by round bars $i$ (slightly arched toward the center as seen particularly in Fig. 3) and strengthened by two stud bars $i'$ running parallel with same.

$j$ $j$ are guide rods, with rollers or wheels $j'$ at their ends, which are fixed to the ends of the main screen "A" and depend therefrom, projecting below the doors $c$ when the latter are open. These guide rods $j$ serve to keep the grab "B" in proper alinement with the opening of the main screen "A", so as to insure its entering the screen notwithstanding any inclination to sway as it is being hauled up. Additional rollers or wheels $J^2$ are also fixed to the bottoms of the sides of the main screen to act in a similar manner in guiding the bucket "B" into main screen "A".

The supplementary screening and lifting bucket "B" is an automatically, or otherwise, filling bucket or grab somewhat in the shape of a half barrel about 4' 6"x5', and in which are fitted the two screening, distributing, and retarding, shelves $k$ $k'$, seen more clearly in Fig. 2, composed of detachable iron or steel bars, or open grating, with turned up (retarding) ends.

The shelf $k$ on one side is fixed at a higher level than the other shelf $k'$.

The outer shell of the bucket "B", is in 3 sections, viz; the top of solid steel or iron, the middle of open iron or steel grating, and the lower section consisting of detachable open iron or steel interlacing (jigging) bars.

The ends or extreme points or prongs of the interlacing bars are turned up at right angles for about 2 or 3 inches in length (somewhat in the shape of a half spear or arrow head, (see Fig. 8) and act as disturbers, clearers, and retarders, or in other words, a jigging disturbing screen.

A jigging hasp, Fig. 2, consisting of a hook $m$ and pin $n$, is fixed to either or both ends of the bucket, and attached to the top of said jigging hasp and conveyed over pulleys fixed to the crane jib and thence on to the drum of the crane is a thin rope $m'$ to disconnect the hasp and pin by raising the said hasp.

The bucket "B" is so designed as to overlap at each end $b''$ to an extent equal to the length of the jigging interlacing bars.

From the four top corners of the bucket "B" are attached round steel bar hangers $o$ to a pulley block $o'$ containing the usual pulley wheels which enable the bucket to be opened, shut, lowered, and hoisted by a chain or a wire rope worked in the single-chain grab manner from a steam or electric derrick crane of the usual loco type. These hangers are rounded near the end next to the bucket and shaped so as to act as additional guides to the bucket when entering the main screen.

Affixed on top of the above mentioned pulley block $o'$ is an engaging plate $p$ which, as the grab "B" is lifted through the main screen "A", makes contact with the under sides of the rods $i$ on the racks $h$ and, as hauled up, raises the racks $h$, the teeth of which engaging with the teeth on the quadrants $g$ cause the latter to turn and with them the spindles $f$ to which the doors $c$ are attached, and thus close said doors.

The whole operation including the lifting of the coal and other material from the bulk, the partial screening followed by the complete screening and depositing into railway trucks ready for transport, is as follows:—

Having fixed the main screen "A", to the end of the jib "C" of the crane and attached the bucket "B" to the main chain $q$ of the crane the whole apparatus is run over the railway by the loco crane to the heap of coal or other material in bulk to be lifted and graded into various classes, and empty trucks are placed at either end of the crane with apparatus or on an adjacent line ready to receive the graded classes of coal or other material.

The jib of the crane is then swung over the material in bulk and the bucket "B" is lowered on to same and automatically filled and hoisted and swung over the truck which is to receive the dust or fine coal or other fine material.

We now have the bucket "B" filled with its load of material ready to be graded, the bottom portion of the shell of the bucket now being a solid floor owing to the screening bars $l$ of the same being interlaced, see Fig. 6.

The middle portion of the shell of the bucket, although being formed of open grating, does not yet allow any of the contents to percolate through, owing to the contents having been compressed into a compact mass under the shelves $k$ $k'$ when being automatically filled.

The bucket "B" is next partially opened, with the result that the interlacing bars $l$ become unlaced excepting at their extreme points see Fig. 7, and so form themselves into a sieve, or screen bars, through which the finer material percolates into a truck and the contents of the bucket "B", having been thereby loosened, the finer material also commences to percolate through the open grating in the bucket immediately above the said interlacing bars.

The bucket is prevented from opening wider than is required, i. e., beyond the length of the interlacing, jigging, or screen, bars, by the jigging hasp $m$ coming into operation and engaging the pin $n$ during this operation, the contents of the bucket are prevented from escaping through the end of the bucket by reason of the ends overlapping as aforesaid. A jigging movement is thus obtained by the bucket being repeatedly closed and partially opened as above described, this being performed by lowering and raising the crane main chain $q$, operated from the platform of the crane. The turned up ends or prongs $l'$ of the bottom screening or jigging bars $l$ to keep disturbing the contents of the bucket and also keep clear the bars so that they do not become blocked up.

As the coal or other material in the bottom portion of the bucket is liberated, the small or fine material also begins to percolate through the bars of the shelves $k$ $k'$, the latter retaining the larger material on their surface.

The above operations having separated part of the fine material from the larger material to a certain extent, and the remaining contents of the bucket now requiring a more energetic jigging movement, the bucket is drawn up by the main chain $q$, of the crane up and into the main screen "A."

Immediately prior to this operation, the drop swing jigging doors $c$ of the main screen "A" are hanging in the vertical position.

The bucket "B" is guided, in the event of the swaying of same, into the center of the main screen by the aid of the hangers $o$ attached to the top of the bucket and also by the wheels $j'$ attached to the metal guide rods $j$ fixed on each end of the main screen and projecting below the bottom of the drop swing jigging doors, and also by wheels $J^2$ fixed for the same purpose to the bottom of the sides of the main screen "A."

In the passage of the bucket into the main screen, the engaging plate $p$ fixed to the top of the pulley block $o'$ of the bucket "B" engages the cross or connecting bars $i$ which run over the top of the main screen, and the engaging bars, being already connected with the two racks $h$ the doors $c$ are automatically drawn up by the bucket with the aid of the quadrants $g$ fixed to each of the hinge bars $f$ on the main screen until the doors rest at an angle of about 45 degrees above the horizontal and immediately below the bucket "B."

We now have the doors of the main screen "A" forming sloping or chute screens ready to receive the remaining contents of the bucket "B." The latter is then gradually opened so as to allow the whole of the remaining contents to be deposited on to the sloping screen bars comprising the doors $c$ or floor of the main screen "A."

The shelves $k$ $k'$ in the interior of the bucket "B," being fixed at different points, discharge in rotation and prevent the contents of the shelves from being discharged simultaneously, thereby helping toward the thorough screening or separating of the material, by retarding the contents during its discharge.

The remaining contents of the bucket "B" having now been all discharged on to the sloping screen bars comprising the doors c or floor of the main screen (and the shock by the weight of falling material having been minimized by shock absorbers fixed to the bottom end of the rods a) and, assuming that all the small or fine coal or other material, has not found its way through the said screening bars (or meshes), the final operation of screening is accomplished by the screening doors of the main screen being slowly lowered from the angle of 45 degrees as shown in Fig. 2, above the horizontal to a like angle below the horizontal, thereby forming a second slide or jigging motion to distribute the coals or other material and cause the contents to completely alter their position on the bars.

The said screening doors in the position of 45 degrees below the horizontal do not protrude below the sides b of the main screen "A." To prevent the finer coal or other material finding its way through the open grating or sides of the main screen "A" and thence on to the teeth of the quadrants g and h and so interfering with the working thereof, a lining of sheet iron d is fixed inside that portion of the main screen "A" immediately adjacent to the said quadrants and racks.

The upward and downward jigging operation is then repeated until such time as all the small or finer material has found its way into the railway truck through the screening doors of the main screen.

We now have the main screen containing the larger material only with the bucket hanging above same empty. The apparatus is then swung around by means of the crane to the truck or other receptacle which is to receive the screened or larger material. The doors of the main screen are then allowed to drop to the vertical position and the contents discharged into the truck.

The main screen "A" and the subsidiary screen or bucket "B" are now both empty and in a position for dealing with another load and are again swung over the material in bulk by the crane, and the whole of the above operation repeated.

In the event of a partial screening or separating of material only being required instead of a thorough screening, the main screen alone can deal with the separating by the bucket being opened out to its full extent over or into the main screen, and discharge the whole contents in one movement into the main screen in the same way as an ordinary grab would do.

The partial screening or separating to a lesser extent can also be brought about by bringing the bucket "B", jigging screening bars l, and hasp m, into operation for a while over one truck before opening the bucket out to its full extent over the second truck. This would be dispensing with the main screen.

The doors c of the main screen "A" may as aforesaid be operated by toggle links (or other suitable means) and in Fig. 4, an adaptation of the toggle link mechanism is outlined as being one of the other methods which may be employed in lieu of the racks and quadrants above described.

In this figure the toggles are arranged at each side of the main screen "A", the two toggle sets being connected by the swivel cross bars r, the engaging plate p of the bucket "B" making contact therewith and actuating the links s s', the latter of which being fixed to the hinge rod f of the doors c, and as raised or lowered correspondingly moving the doors.

Having now particularly described and ascertained the nature of our said invention and in what manner the same is to be performed we hereby declare that what we claim is:—

1. Portable screening apparatus for coal and other materials comprising a main screen, a supplementary screening and lifting bucket arranged to pass through said main screen, a jib supporting the screen and bucket, and means operable by the movement of the bucket to open and close the bottom of the screen.

2. Portable screening apparatus for coal and other materials comprising a jib, a main screen supported by the jib, a supplementary screening and lifting bucket secured to the main chain of a derrick crane and arranged to pass through said main screen, and means operable by the movement of the bucket to open and close the bottom of the main screen.

3. In a portable screening apparatus as claimed in the preceding claims, the combination with the main screen "A" and lifting bucket "B" of a mechanism operated by the movements of said lifting bucket "B" for automatically opening and closing the hinged doors forming the bottom of the main screen "A".

In testimony whereof we have signed our names to this specification in the presence of two subscribing witnesses.

CHARLES MILTON MORTON.
CHARLES HERBERT STEAVENSON.

Witnesses:
T. D. FENWICK,
A. E. DAWSON.